W. W. JONES.
MOTOR TRUCK.
APPLICATION FILED MAY 28, 1912.

1,057,844.

Patented Apr. 1, 1913.

2 SHEETS—SHEET 1.

Witnesses
W. J. McDowell.
R. M. Smith.

Inventor
William W. Jones
By Victor J. Evans
Attorney

W. W. JONES.
MOTOR TRUCK.
APPLICATION FILED MAY 28, 1912.

1,057,844.

Patented Apr. 1, 1913.

2 SHEETS—SHEET 2.

Witnesses
W. S. McDowell
R. M. Smith

Inventor
William W. Jones
By Victor J. Evans
Attorney

UNITED STATES PATENT OFFICE.

WILLIAM W. JONES, OF TOLEDO, OHIO.

MOTOR-TRUCK.

1,057,844.  Specification of Letters Patent.  Patented Apr. 1, 1913.

Application filed May 28, 1912. Serial No. 700,248.

*To all whom it may concern:*

Be it known that I, WILLIAM W. JONES, a citizen of the United States, residing at Toledo, in the county of Lucas and State of Ohio, have invented new and useful Improvements in Motor-Trucks, of which the following is a specification.

This invention relates to motor trucks, the object in view being to provide a truck which is especially adapted for farm purposes, such as plowing, cultivating, ditching, and general hauling, the truck embodying a construction and arrangement of parts which will adapt the same to be turned in the shortest possible space, and which will permit the direction of movement of the truck to be accurately gaged, thereby adapting the truck as a whole especially for use on small farms, where frequent and abrupt turning is necessary.

With the above and other objects in view, the invention consists in the construction, combination and arrangement of parts, as will be hereinafter more fully described, illustrated in the accompanying drawings, and pointed out in the claim hereunto appended.

Figure 1:
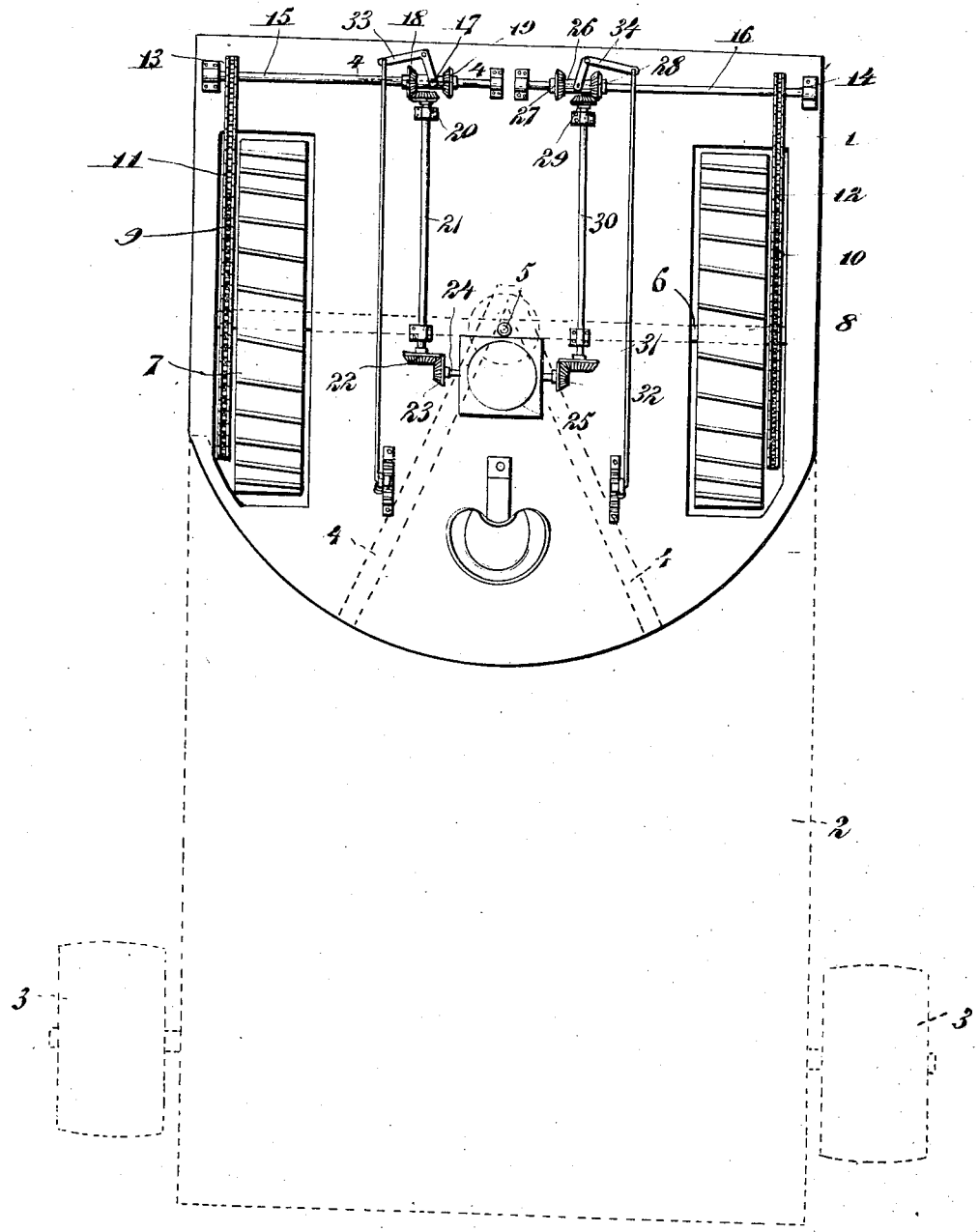
Figure 2:
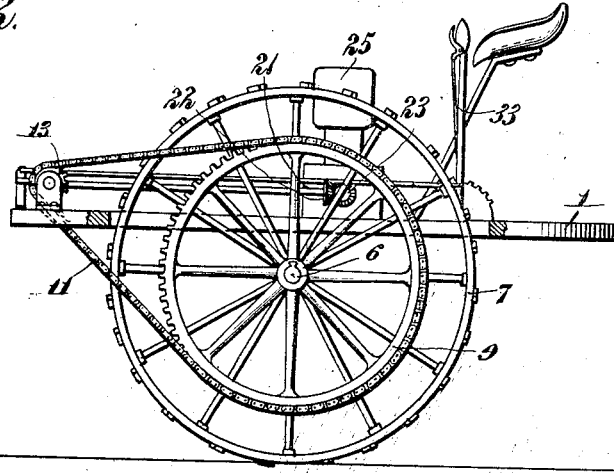
Figure 3:
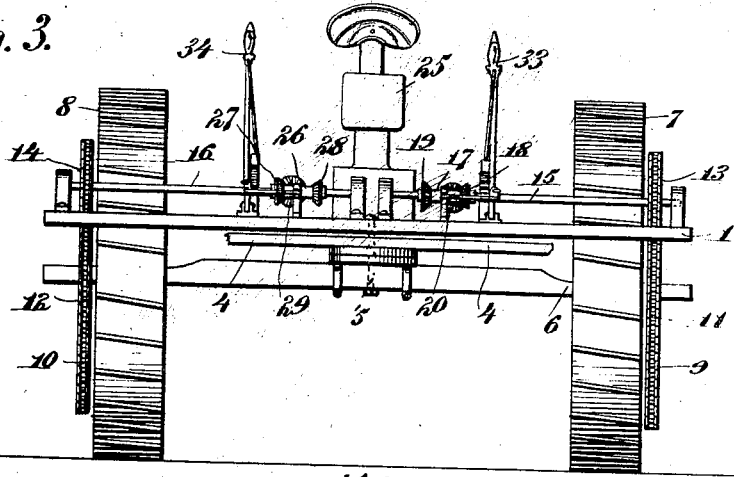
Figure 4:
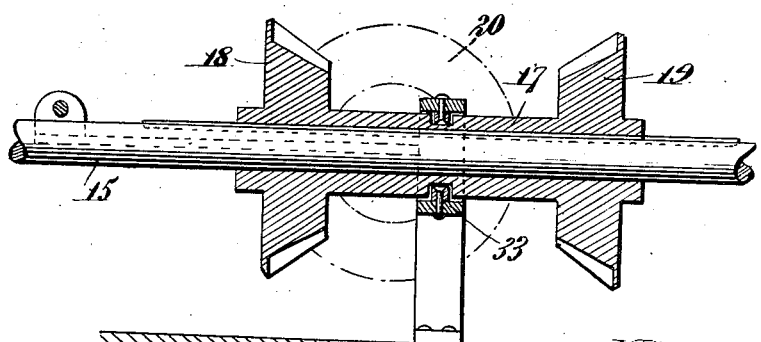

In the drawings: Figure 1 is a plan view of a truck, embodying the present invention, illustrating the detachable rear section of the truck in dotted lines. Fig. 2 is a side elevation of the same. Fig. 3 is a front elevation thereof. Fig. 4 is a detail section on the line 4—4 of Fig. 1.

The truck contemplated in this invention is made in two sections, 1 designating the front section, and 2 indicating by dotted lines the rear section, which, in this instance, is shown in the form of an ordinary flat wagon for hauling purposes. The rear section 2 which may be of any desired construction, and which may consist either of a wagon body, plow, cultivator, ditcher, or other agricultural machine, is equipped with suitable carrying wheels 3, and provided at the forward portion thereof with a forwardly extending reach frame, shown for convenience as embodying forwardly converging bars 4, rigidly connected to the rear section of the truck, and pivotally connected by a central king bolt 5 to the front section of the truck, as shown in Fig. 1. The front section 1 is supported by an axle 6, upon the opposite ends of which are loosely mounted the combined traction and steering wheels 7 and 8.

The wheels 7 and 8 are provided, preferably at the outer sides thereof, with sprocket wheels 9 and 10, from which chains 11 and 12 extend forward around other sprocket wheels 13 and 14, on a divided counter shaft, the two sections of which are represented at 15 and 16. On the section 15, there is mounted a sliding sleeve 17 which is feathered or splined to the shaft section 15, so as to rotate therewith, and slide lengthwise thereon. Fast on the sleeve 17 are the oppositely arranged bevel gear wheels 18 and 19 adapted to alternately mesh with a pinion 20 on the forward end of a transmission shaft 21, provided at its rear end with a bevel gear wheel 22 which meshes with a pinion 23 on one end of the crank shaft 24 of a gasolene or other motor 25, the latter being mounted directly on the forward section of the truck, adjacent to the center thereof. Mounted on the shaft section 16 is another sliding sleeve 26 which is the counterpart of the sleeve 17, the same being splined to the shaft 16, so as to slide thereon and rotate therewith. The sleeve 26 has fast thereon the bevel gear wheels 27 and 28 adapted to alternately mesh with a pinion 29 on another transmission shaft 30 extending substantially parallel to the transmission shaft 21 and provided at its rear end with a bevel gear wheel 31 which meshes with a pinion 32 on the end of the crank shaft 24 opposite the pinion 23 above referred to.

Control levers 33 and 34 are connected, respectively, with the sleeves 17 and 26 for shifting said sleeves either simultaneously or independently of each other for throwing either one of the gears 18 or 19 into mesh with the pinion 20, or for throwing either one of the pinions 27 or 28 into mesh with the pinion 29.

From the foregoing description, it will now be seen that with the gears arranged as shown in Fig. 1, both of the wheels 7 and 8 will be driven forward equally. It will also be seen that by shifting both of the sleeves 17 and 26 to the full extent of their movement, equal motion will be imparted to the wheels 7 and 8 in a reverse direction, for backing the truck. It will also be seen that by shifting one of the sleeves 17 or 26, one of the traction steering wheels will be driven in a forward direction, while the other is driven backward, thus effecting a quick turning of the forward section of the truck.

To make a comparatively slow turn, one of the transmission shafts may be left in gear to drive one of the traction wheels forward, while the other may be thrown out of gear, so as to allow the traction wheel on that side to remain idle. In this way, the guiding and turning of the forward section of the truck may be readily controlled with accuracy at all times.

By reason of the ability to steer with the front wheels of the truck, the best ground may be selected, over which to propel the truck, and a more natural and easy method of turning is attained, the rear section of the truck simply following behind the front steering section thereof. The arrangement described adds further to the convenience of mounting the operative mechanism of the truck, without disturbing or utilizing any of the space of the rear portion thereof, whether it be in the form of a wagon or other agricultural implement.

What is claimed is:

A motor truck, comprising separable pivotally connected front and rear sections, a front axle on the forward section, steering traction wheels loose on said axle, a centrally located motor carried by the front section, a divided counter shaft comprising two independent sections, each separately geared to one of said wheels, transmission shafts geared to the motor shaft and extending perpendicularly thereto and to the counter shaft, sleeves splined to the counter shaft and each carrying a pair of reversely facing gears movable alternately into and out of engagement with gears on the transmission shafts, shipping levers operatively connected with said sleeves, and independent hand levers connected with said shipping levers.

In testimony whereof I affix my signature in presence of two witnesses.

WILLIAM W. JONES.

Witnesses:
HARRY LEVISON,
MARY SHEFFINGTON.

---

Copies of this patent may be obtained for five cents each, by addressing the "Commissioner of Patents, Washington, D. C."